United States Patent [19]
Kotlar

[11] 3,746,176
[45] July 17, 1973

[54] SHIPPING RACK
[76] Inventor: Edward A. Kotlar, 21115 Mack Avenue, Grosse Pointe Woods, Mich. 48236
[22] Filed: Aug. 2, 1971
[21] Appl. No.: 168,283

[52] U.S. Cl.................. 211/13, 206/62 R, 211/175
[51] Int. Cl............................ A47f 5/10, A47f 7/00
[58] Field of Search........................ 211/13, 41, 175; 206/62 R; 214/10.5; 220/84; 248/119 R

[56] References Cited
UNITED STATES PATENTS
2,129,951 9/1938 Loney et al............................ 211/13
3,533,502 10/1970 Hansen ........................ 206/62 R X Primary Examiner—Ramon S. Britts
Attorney—Barnes, Kisselle, Raisch & Choate

[57] ABSTRACT

A shipping rack for vehicle body panels with vertical corner posts and laterally movable side gates. Indexable retainers each having multiple sets of saddles adapted to receive and restrain movement of an edge of a body panel provide a shipping rack which can be readily adjusted to accommodate body panels of various sizes and shapes.

12 Claims, 6 Drawing Figures

Patented July 17, 1973

INVENTOR.
EDWARD A. KOTLAR
BY
Barnes, Kisselle, Raisch & Choate
ATTORNEYS

Patented July 17, 1973
3,746,176
2 Sheets-Sheet 2
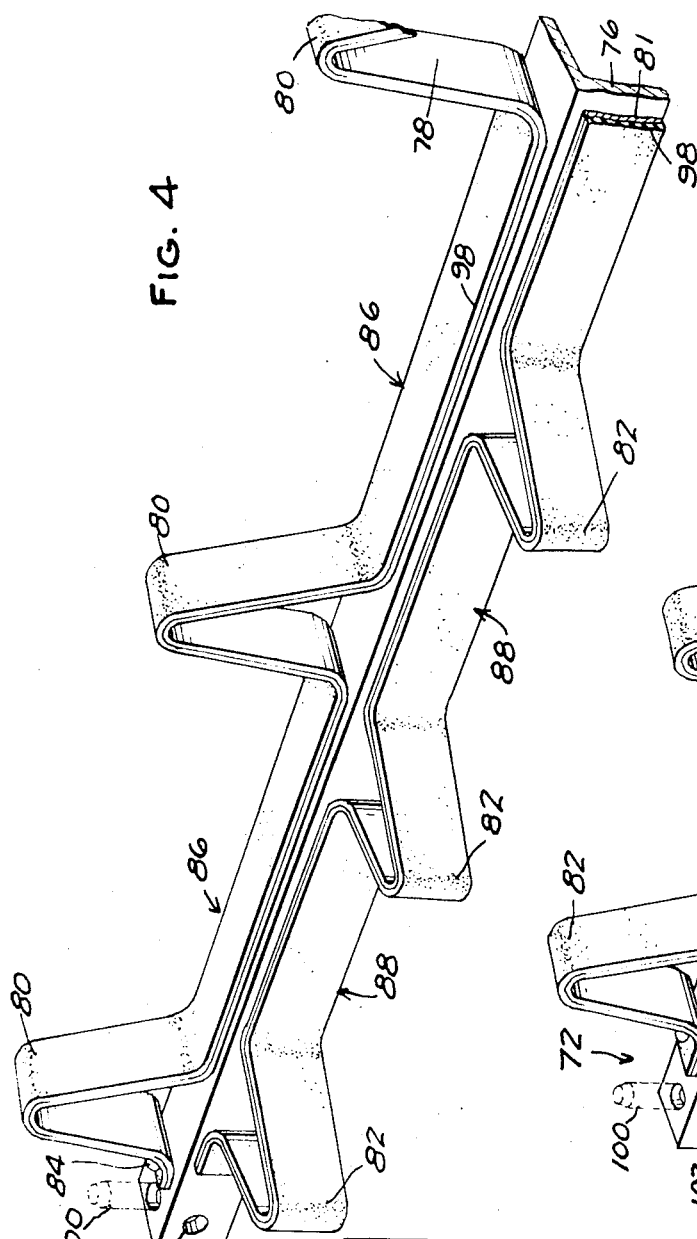
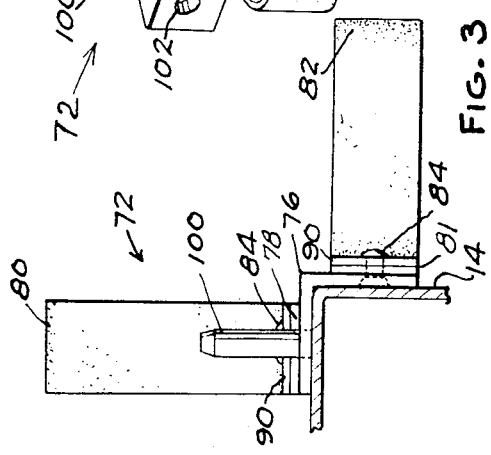
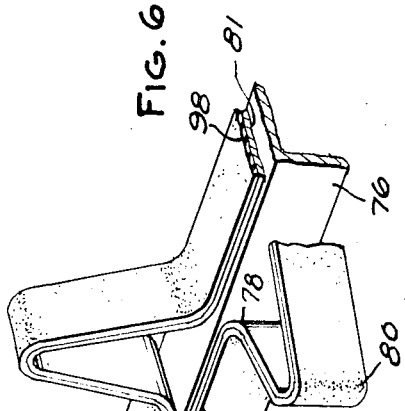
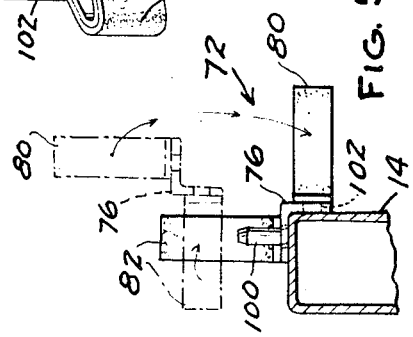
INVENTOR.
EDWARD A. KOTLAR
BY
Barnes, Kisselle, Raisch & Choate
ATTORNEYS

SHIPPING RACK

This invention relates to shipping racks and more particularly to adjustable shipping racks for vehicle body panels such as automobile fender, roof and hood panels.

Shipping racks with vertical corner posts providing fixed end walls and movable side gates for receiving a particular body panel are old. Such racks usually accommodate body panels of only one size and shape and are not readily adjustable to accommodate body panels of various sizes and shapes. Thus, a specific rack design must ordinarily be provided for each different size and shape body panel for each vehicle model year.

Objects of this invention are to provide a shipping rack which (1) can be readily adjusted to accommodate vehicle body panels of various sizes and shapes and (2) can be economically manufactured and assembled and is relatively service and maintenance free.

These and other objects, features, and advantages of this invention are disclosed in the following specification and accompany drawings in which:

FIG. 3 is a fragmentary sectional view on line 3—3 of FIG. 1 showing an indexable panel retainer mounted on a stringer.

FIG. 4 is a fragmentary isometric view of a panel retainer with two sets of saddles.

FIG. 5 is a fragmentary sectional view similar to FIG. 3 illustrating the indexing of a retainer.

FIG. 6 is a fragmentary isometric view of the retainer of FIG. 4 turned end-for-end and indexed ninety degrees.

Figure 1:
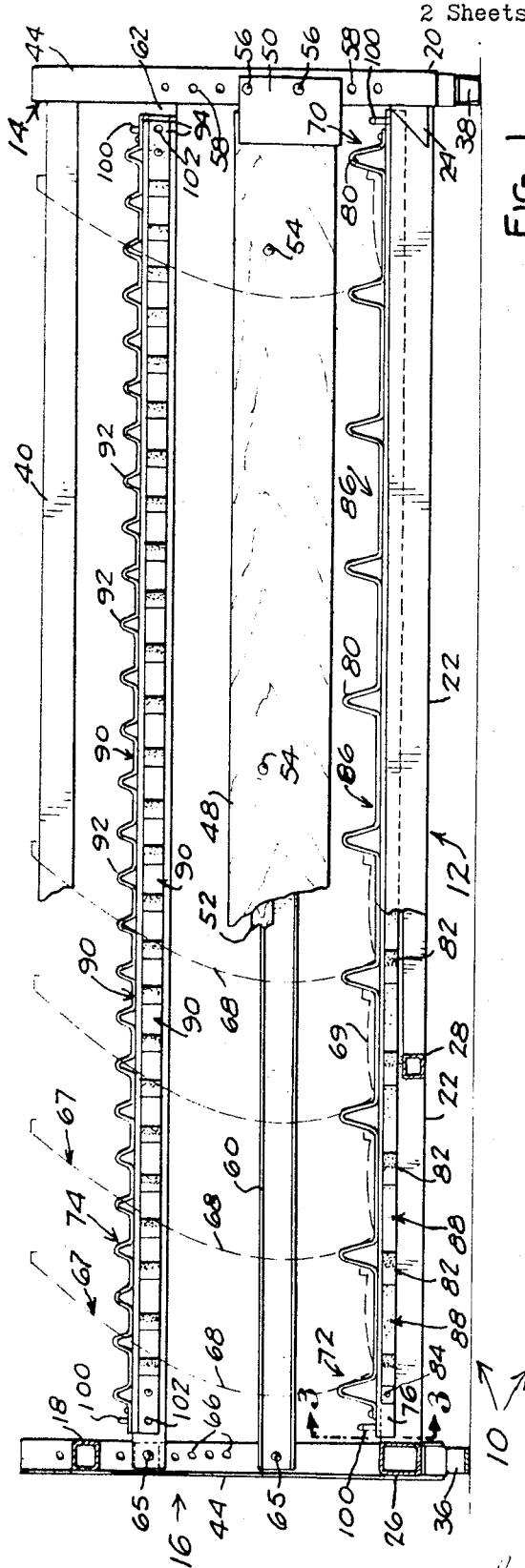
FIG. 1 is a side view partially in section of a shipping rack embodying this invention.

Referring to the drawings:

The shipping rack 10 of the present invention cOnsists essentially of a main support frame 12 (FIG. 2) on which side gates 14, 16, respectively, are adjustably mounted by means of arms 18. Frame 12 includes four corner posts 20. The two corner posts at each side of frame 12 are interconnected by tubular longitudinal stringers or support bars 22, the connection between the ends of stringers 22 and posts 20 being reinforced by gusset plates 24. The two corner posts at each end of frame 12 are interconnected by laterally extending cross braces 26. The bottom of frame 12 is reinforced by a plurality of cross braces 28 (FIG. 1) which extend laterally between the two longitudinal stringers 22. At each end of frame 12 the two corner posts 20 are also interconnected by upper and lower guide tubes 30, the connections between tubes 30 and corner posts 20 being reinforced by gusset plates 32. The opposite ends of guide tubes 30 are open and are adapted to slideably receive arms 18 of gates 14, 16.

Rack 10 is adapted to be supported on a ground surface by means of runners 36 at each end. Vertical stacking of the racks is facilitated by plugs 38 at the lower ends of each corner post 20, the plugs being adapted to telescope into the open upper ends of the posts 20 of an underlying rack. After a rack is loaded with panels to be shipped it may further be reinforced by an upper longitudinal stringer 40 which is detachably connected at its opposite ends with the upper guide tubes 30 by pins 42.

Side gates 14 and 16 each have a pair of longitudinally spaced angle iron uprights 44 fixed to tubular arms 18. Gates 14 and 16 are releasably locked on frame 12 in various laterally spaced positions by pins 46 extending through guide tubes 30 and one of a plurality of axially spaced holes through arms 18. Side gate 14 includes a bumper board 48 that extends longitudinally between and is connected to uprights 44 through mounting plates 50 (FIG. 1). A hold-down board 52 (FIG. 2) is fixed to bumper board 48 by fasteners 54. Bumper board 48 and hold-down board 52 are secured in vertically adjustable position by bolts and nuts 56 received in spaced holes 58 in uprights 44 of gate 14. Side gate 16 includes a U-shaped tie bar 60 and a tubular support bar 62 extending longitudinally between uprights 44. Spacer brackets 64 are fixed to the ends of support bar 62 and both brackets 64 and tie bar 60 are secured in vertically adjustable positions to uprights 44 by bolts and nuts 65 received in spaced holes 66.

Figure 2:
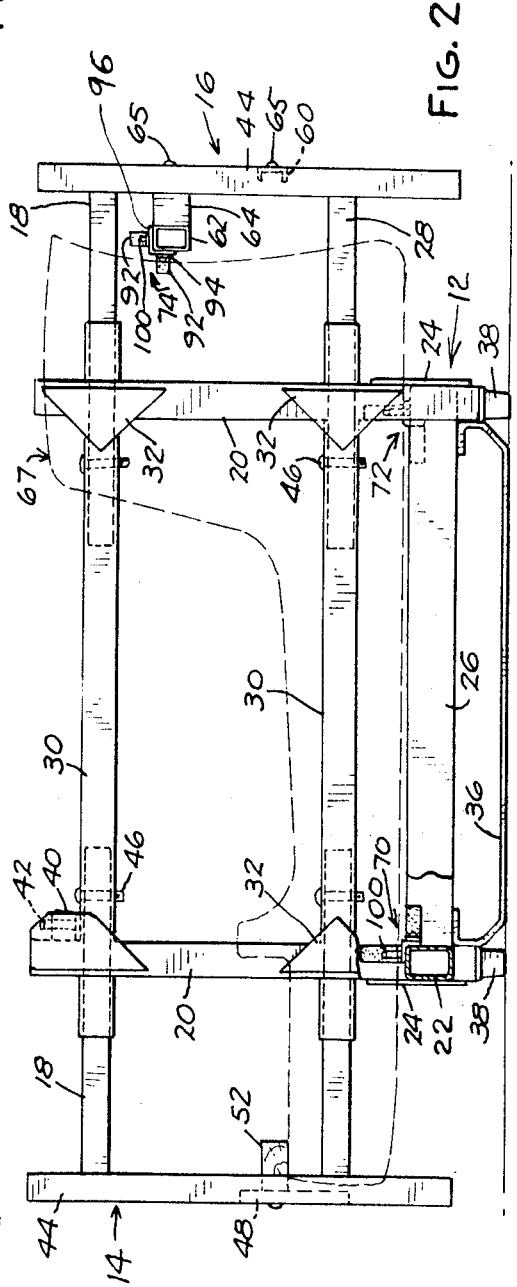
FIG. 2 is an end view partially in section of the shipping rack of FIG. 1.

In FIGS. 1 and 2 the shipping rack is shown loaded with vehicle fender panels 67 having a curved side wall 68 and a bottom wall 69. The rack is designed to support panels 67 in a generally vertical spaced apart position as shown. Such support is obtained essentially through the use of three retainers 70, 72, 74. Retainers 70, 72 are mounted on stringers 22 and are adapted to engage the bottom wall portion 69 of the panels. Retainer 74 is mounted on gate support bar 62 and engages the edge of upper side wall portion 68 of the panels.

In the embodiment illustrated retainers 70, 72 are of identical construction and symmetrical about their transverse centerlines. Thus, only retainer 72 will be described in detail. Retainer 72 comprises an angle iron stringer 76 having perpendicularly related legs. On the outer face of one leg of stringer 76 there is secured a steel strap 78 corrugated to provide a series of equally spaced lugs 80 defining saddles 86 therebetween. The other leg of stringer 76 has secured thereto a steel strap 81 corrugated to provide a second series of equally spaced lugs 82 defining saddles 88 therebetween. Lugs 80 are spaced further apart than lugs 82 and, accordingly, saddles 86 are wider than saddles 88. Thus, saddles 86 can accommodate panels having a wider bottom wall portion 69 than saddles 88. Straps 78, 81 can be secured to stringer 76 in any suitable manner such as by rivets 84.

As shown in FIGS. 1 and 2, retainer 74 is similar to retainers 70, 72 and has two sets of yokes or saddles 90 provided by a plurality of equally longitudinally spaced lugs 92 formed by steel straps 94, mounted on an angle iron stringer 96 at a right angle to each other and longitudinally offset with respect to each other. The two sets of saddles are offset to facilitate retaining body panels having differently inclined sidewalls 68 in a generally vertical position in rack 10. If desired, the two sets of saddles on retainer 74 can be formed with different spacings between the lugs 92 of each set to receive and restrain body panels with side edge flanges of different widths. To prevent scratching of body panels 67, straps 78, 81, and 94 have a vinyl plastic coating 98 vulcanized or bonded to their outer faces. As shown in FIGS. 1, 2 and 3, retainers 70, 72 and 74 are removably mounted on their respective supports 22 and 62 by pins 100 fixed to support bars 22 and 62 and extending through holes 102 in the opposite ends of both faces of stringers 76 and 96 of the retainers.

In adjusting rack 10 to receive a body panel such as front fender panel 67, the wide or narrow saddles 86 or 88 are selected to accommodate the bottom wall 69 of fender 67. If the wide saddles 86 are to be used, holes 102 of retainers 70 and 72 are slipped over pins 100 on support bars 22 with the retainers in the position shown in FIGS. 1, 3 and 4 with lugs 80 extending vertically upward and lugs 82 extending horizontally inward. To use saddles 88, retainers 70 and 72 are removed from pins 100 (FIG. 3), turned end-for-end (as shown in phantom in FIG. 5), indexed or rotated 90° and slipped over pins 100 (as shown by the arrows in FIG. 5) to assume the position shown in FIGS. 5 and 6 with lugs 82 enxtending vertically upward and lugs 80 extending horizontally inward. Similarily, retainer 74 is turned end-for-end, indexed ninety degrees and slipped over pins 100 on its support bar 62 to align saddles 90 so that they will receive and retain a side edge of fender panel 94 when the fender is in a substantially vertically extending position as shown in FIG. 1. If desired, retainers 70, 72, and 74 can be simply indexed or rotated ninety degrees without being turned end-for-end to select the desired saddles. However, if the retainers are not turned end-for-end when they are indexed, the lugs of one of the sets of saddles will extend horizontally outward, rather than inward, from their support bars 22 and 62 and will be more susceptible to damage. Side retainer 74 is laterally positioned by extending or retracting gate 16. The position of gate 16 is adjusted by removing pins 46 from guide tubes 30, shifting arms 18 in the guide tubes, and reinserting pins 46. Side retainer 74 can also be adjusted vertically on gate 16 by removing and reinserting nuts and bolts 65 in spaced holes 66.

Gate 14 is extended and each panel 67 is positioned on rack 10 so that its bottom wall 69 is received in saddles 86 or 88 of retainers 70 and 72 and the upper portion of its side edge is received in saddles 90 of retainer 74 with the panel in a substantially vertical position. Hold-down board 52 is adjusted vertically to bear on the upper front edge of fender panel 67 by removing and reinserting bolts and nuts 56 in holes 58 of uprights 44. Bumper board 48 is moved laterally inwardly for engagement with the front side edge of fender panel 67 by retracting gate 14 which is releasably retained by pins 46 extending through guide tubes 30 and arms 18 (as shown in FIG. 2). Bumper board 48 maintains the rear side edge of each fender panel 67 in engagement with its associated saddle 90 of side retainer 74 and hold-down board 52 retains the lower edge of fender 68 in the saddles of retainers 70 and 72. Tie bar 40 is slipped over pins 42 to restrain corner post 20 and frame 12 from flexing during shipment or movement of rack 10.

Fender panels 67 are removed from shipping rack 10 in substantially the reverse order in which they were placed in the rack. Tie bar 40 is removed and gate 14 is laterally extended to disengage hold-down board 52 and bumper board 48 from fender panels 68 and to provide access to the panels. Fender panels 68 are removed from carrier 10 and if necessary retainers 70, 72, and 74 are turned end-for-end and indexed to provide the proper arrangement of saddles fo next group of body panels to be shipped in rack 10.

The use of indexing retainers having multiple sets of saddles adapted to receive different width lower edges of various body panels provides a shipping rack which can be readily adjusted to accommodate a large variety of different size body panels. This adjustability is also facilitated by an indexing side retainer with multiple sets of saddles which are either offset or have a different width or both to provide proper saddle alignment for retaining various shaped body panels in a generally vertical position.

What is claimed as new is as follows:

1. A shipping rack adjustable to accommodate various size vehicle body panels therein, comprising: a frame, first and second longitudinally extending retainers carried in laterally spaced generally parallel relation by said frame, each of said first and second retainers having at least a first and a second set of a plurality of longitudinally spaced saddles thereon adapted to receive and restrain the movement in a longitudinal direction of a portion of a body panel, each of said first and second sets of saddles being ridigly secured in a single position on said retainers, the saddles of the first set being of a width different than that of the saddles of the second set, whereby the saddles of said first set when in operative position are arranged to receive an edge portion of one body panel and the saddles of the second set when in operative position are arranged to receive an edge portion of a differently dimensioned panel, said first and second sets of saddles on each of said first and second retainers being angularly spaced from each other about the longitudinal axis of their respective retainer such that when one of the sets of saddles is positioned to receive a body panel the other set of saddles will be disengaged from said panel, and means adjustably carrying said first and second retainers on said frame such that the first and second set of saddles of each of said first and second retainers can be selectively positioned to receive a portion of a body panel, whereby said rack can be readily adapted to receive and retain body panels of different dimensions by indexing said first and second retainers to select predetermined sets of saddles to receive and retain an edge portion of the body panels.

2. The shipping rack of claim 1 which also comprises a third longitudinally extending retainer in generally parallel relation to and vertically spaced from said first and second retainers, said third retainer having at least a first and a second set of generally longitudinally extending saddles thereon with the first and second sets of saddles being generally angularly spaced about the axis of said third retainer such that when one of the sets of saddles of the third retainer is positioned to receive an edge portion of a body panel the other set of saddles is disengaged from said body panel, and means carried by said frame and carrying said third retainer such that said third retainer can be indexed to selectively position the first and second set of saddles thereof to engage and restrain a body panel.

3. The shipping rack of claim 2 which also comprises a side gate carried by said frame for generally lateral movement with respect to said frame and in which said third retainer is connected to said side gate for generally lateral movement therewith.

4. The shipping rack of claim 1 in which said first and second sets of saddles of said retainers are oriented at substantially a right angle to each other and each of the sets of saddles comprises a plurality of longitudinally spaced lugs.

5. The shipping rack of claim 3 in which said first and second sets of saddles of said retainers are oriented at substantially a right angle to each other and each of the sets of saddles comprises a plurality of longitudinally spaced lugs.

6. The shipping rack of claim 4 in which the lugs of said first sets of saddles are spaced closer together than the lugs of said second sets of saddles.

7. The shipping rack of claim 5 in which the lugs of said first sets of saddles of said first and second retainers are spaced closer together than the lugs of said second sets of saddles of said first and second retainers.

8. The shipping rack of claim 1 wherein said frame includes a plurality of supports having an upstanding pin thereon, each of said retainers having a pair of openings at each end thereof engageable with a corresponding upstanding pin for supporting the retainer on the frame, the axes of said openings being angularly oriented to correspond with orientation of said first and second sets of saddles.

9. The shipping rack of claim 8 wherein each of said retainers comprises a length of angle iron having perpendicularly related legs, said first and second set of saddles being mounted on the outer faces of said legs.

10. The shipping rack of claim 9 wherein said supports comprise a pair of stringers on said frame, each of said stringers having a generally horizontally disposed support surface and generally vertically disposed support surface for cooperation with the inner faces of the legs of said angle irons.

11. A shipping rack adjustable to accommodate various size vehicle body panels in a generally vertically disposed position therein, comprising: a frame having laterally spaced generally parallel stringers and four generally vertically extending corner posts, first and second retainers each having at least a first and a second set of a plurality of longitudinally spaced lugs providing a plurality of saddles thereon adapted to receive and restrain movement of an edge of a body panel extending transversely of said retainers, each of said first and second set of saddles being rigidly secured in a single position on said retainers, the saddles of the first set being of a width different from that of the saddles of the second set, each of said first set of saddles being angularly spaced from said second set of saddles such that when the saddles of one set are positioned to receive an edge of a panel the saddles of the other set will be disengaged from said edge of the panel, and means adjustably carrying said first and second retainers on said frame such that said first and second retainers can be selectively indexed to position the first and second set of saddles of each of said retainers to receive an edge of a body panel, whereby said shipping container can be adjusted to accommodate body panels having edges of various widths.

12. The shipping rack of claim 11 which also comprises a gate carried by said frame for generally lateral movement thereto, a third retainer extending generally parallel to and vertically spaced from said first and second retainers, said third retainer having at least a first and a second set of a plurality of generally longitudinally spaced lugs providing a plurality of saddles adapted to receive and restrain movement of an edge of a body panel, said first and second set of lugs of said third retainer being angularly spaced about the axis of the third retainer such that when one set of saddles receives an edge of a body panel the other set of saddles will be disengaged from the edge of the panel, and means connected to said gate and carrying said third retainer such that said third retainer can be indexed to selectively position said first and said second set of saddles of said third retainer to receive and restrain an edge of a body panel with said third retainer being laterally movable with said gate.

* * * * *